(12) United States Patent
Glime, III et al.

(10) Patent No.: US 12,123,808 B2
(45) Date of Patent: Oct. 22, 2024

(54) FLUID COMPONENT BODY WITH LEAK TEST PASSAGES

(71) Applicant: Swagelok Company, Solon, OH (US)

(72) Inventors: William H. Glime, III, Chagrin Falls, OH (US); Branden W. Keeper, Mentor, OH (US)

(73) Assignee: Swagelok Company, Solon, OH (US)

( * ) Notice: Subject to any disclaimer, the term of this patent is extended or adjusted under 35 U.S.C. 154(b) by 337 days.

(21) Appl. No.: 17/785,444

(22) PCT Filed: Dec. 16, 2020

(86) PCT No.: PCT/US2020/065200
§ 371 (c)(1),
(2) Date: Jun. 15, 2022

(87) PCT Pub. No.: WO2021/126900
PCT Pub. Date: Jun. 24, 2021

(65) Prior Publication Data
US 2023/0058181 A1 Feb. 23, 2023

Related U.S. Application Data

(60) Provisional application No. 62/951,527, filed on Dec. 20, 2019.

(51) Int. Cl.
*G01M 3/22* (2006.01)
*F16K 7/17* (2006.01)
(Continued)

(52) U.S. Cl.
CPC ............... *G01M 3/224* (2013.01); *F16K 7/17* (2013.01); *F16K 27/003* (2013.01); *F16K 31/1221* (2013.01); *F16K 37/0091* (2013.01)

(58) Field of Classification Search
CPC ........ G01M 3/224; F16K 7/17; F16K 27/003; F16K 31/1221; F16K 37/0091
See application file for complete search history.

(56) References Cited

U.S. PATENT DOCUMENTS

| | | | |
|---|---|---|---|
| 5,485,984 A | 1/1996 | Shigeru | |
| 6,293,310 B1 * | 9/2001 | Redemann | H01J 37/3244 137/884 |

(Continued)

FOREIGN PATENT DOCUMENTS

| | | |
|---|---|---|
| CN | 102804335 | 11/2012 |
| CN | 205748829 | 11/2016 |

(Continued)

OTHER PUBLICATIONS

English translation of CN110082046, accessed from worldwide.espacenet. com.*

(Continued)

*Primary Examiner* — Kristina M Deherrera
*Assistant Examiner* — Jean F Morello
(74) *Attorney, Agent, or Firm* — Calfee, Halter & Griswold LLP

(57) ABSTRACT

A manifold body includes at least first and second valve body segments each comprising an upper perimeter wall portion defining a valve cavity and a lower base portion defining one or more flow ports, a unified leak test port, a first branch leak test passage extending from the unified leak test port to an outer peripheral portion of the valve cavity of the first valve body segment, radially outward of an outer seal surface in the valve cavity, and a second branch leak test passage extending from the unified leak test port to an outer peripheral portion of the valve cavity of the second valve body segment, radially outward of an outer seal surface in the valve cavity.

19 Claims, 13 Drawing Sheets

(51) Int. Cl.
   *F16K 27/00*    (2006.01)
   *F16K 31/122*   (2006.01)
   *F16K 37/00*    (2006.01)

(56) References Cited

U.S. PATENT DOCUMENTS

| | | |
|---|---|---|
| 9,863,542 B2 | 1/2018 | Glime |
| 2005/0224120 A1 | 10/2005 | Milburn et al. |
| 2009/0255596 A1 | 10/2009 | Leys |
| 2019/0136996 A1 | 5/2019 | Glime, III |
| 2020/0003318 A1 | 1/2020 | Glime, III |

FOREIGN PATENT DOCUMENTS

| | | |
|---|---|---|
| CN | 106282462 | 1/2017 |
| CN | 110082046 A | 8/2019 |
| EP | 1895214 A1 | 3/2008 |

OTHER PUBLICATIONS

International Search Report and Written Opinion from PCT/US2020/065200 dated Apr. 16, 2021.
Office action from Chinese Application No. 202080083110.2 dated Jul. 5, 2024.

\* cited by examiner

FLUID COMPONENT BODY WITH LEAK TEST PASSAGES

CROSS-REFERENCE TO RELATED APPLICATION

This application claims priority to and all benefits of International Application No. PCT/US2020/065200, filed on Dec. 16, 2020, which claims priority to and all benefits of U.S. Provisional Patent Application Ser. No. 62/951,527, filed on Dec. 20, 2019, entitled FLUID COMPONENT BODY WITH LEAK TEST PASSAGES, the entire disclosures of which is are incorporated herein by reference.

BACKGROUND

Fluid systems often include multiple valves arranged for mixing, switching, purging, and other such controls of one or more types of fluid, for example, for gas distribution employed in the manufacture of semiconductor wafers. While such fluid control systems may be constructed by welding or otherwise connecting individual valves in a desired configuration, such arrangements may be undesirable due to the time and cost of construction, potential leak points at the many connections, overall size of the assembly, and other such factors.

Multiple valve manifolds have often been used to address one or more of these issues by providing a single body block, machined for desired flow path arrangements, in which multiple valve assemblies are installed to control flow at multiple points within the multi-ported manifold body block. The manifold body block itself, however, may be expensive and difficult to machine, and may be limited in the shapes and orientations of internal ports that may be provided. Additionally, polished surface finish requirements for the manifold body flow paths may be difficult to maintain where the flow paths are extended and/or complex (non-straight).

SUMMARY

In an exemplary embodiment of the present disclosure, a manifold body includes at least first and second valve body segments each comprising an upper perimeter wall portion defining a valve cavity and a lower base portion defining one or more flow ports, a unified leak test port, a first branch leak test passage extending from the unified leak test port to an outer peripheral portion of the valve cavity of the first valve body segment, radially outward of an outer seal surface in the valve cavity, and a second branch leak test passage extending from the unified leak test port to an outer peripheral portion of the valve cavity of the second valve body segment, radially outward of an outer seal surface in the valve cavity.

In another exemplary embodiment of the present disclosure, a valve body includes an upper perimeter wall portion defining a valve cavity and a lower base portion defining one or more flow ports, and a leak test passage formed in the upper perimeter wall portion of the valve body, with a first portion of the leak test passage extending axially through the upper perimeter wall portion to a leak test port exposed on an end surface of the upper perimeter wall portion, and a second portion of the leak test passage extending laterally or radially through a lower end of the upper perimeter wall portion to the valve cavity to intersect with an outer peripheral portion of the valve cavity, radially outward of an outer seal surface in the valve cavity.

In another exemplary embodiment of the present disclosure, a manifold assembly includes a manifold body having at least first and second valve body segments, a first valve subassembly assembled with the first valve body segment and a second valve subassembly assembled with the second valve body segment. Each of the first and second valve body segments includes an upper perimeter wall portion defining a valve cavity and a lower base portion defining a central flow port and an offset flow port; a unified leak test port; a first branch leak test passage extending from the unified leak test port to an outer peripheral portion of the valve cavity of the first valve body segment, radially outward of an outer seal surface in the valve cavity; and a second branch leak test passage extending from the unified leak test port to an outer peripheral portion of the valve cavity of the second valve body segment, radially outward of an outer seal surface in the valve cavity. Each of the first and second valve subassemblies includes a flexible diaphragm, an annular seat carrier received in the valve cavity and including a lower seal portion that seals against a recessed surface around the central flow port and an upper seal portion that seals against the diaphragm when the diaphragm is moved to the closed position, and a threaded bonnet nut installed in the valve cavity to clamp the seat carrier against the outer seal surface in the valve cavity to form a body seal.

In another exemplary embodiment of the present disclosure, a valve assembly includes a valve body and a valve subassembly. The valve body includes an upper perimeter wall portion defining a valve cavity and a lower base portion defining one or more flow ports, and a leak test passage formed in the upper perimeter wall portion of the valve body, with a first portion of the leak test passage extending axially through the upper perimeter wall portion to a leak test port exposed on an end surface of the upper perimeter wall portion, and a second portion of the leak test passage extending laterally or radially through a lower end of the upper perimeter wall portion to the valve cavity to intersect with an outer peripheral portion of the valve cavity, radially outward of an outer seal surface in the valve cavity. The valve subassembly includes a flexible diaphragm, an annular seat carrier received in the valve cavity and including a lower seal portion that seals against a recessed surface around the central flow port and an upper seal portion that seals against the diaphragm when the diaphragm is moved to the closed position, and a threaded bonnet nut installed in the valve cavity to clamp the seat carrier against the outer seal surface in the valve cavity to form a body seal.

In another exemplary embodiment of the present disclosure, a method is contemplated for leak testing first and second valves installed in first and second valve cavities in a multi-valve manifold body. In the exemplary method, the manifold assembly is provided in a fluid system under a vacuum, and the manifold assembly is connected with a leak detection device. A test fluid is supplied to a unified leak test port in the manifold body, such that the test fluid is transmitted through first and second branching leak test passages to outer peripheral portions of the first and second valve cavities. The leak detection device is used to measure ingress of the test fluid past first and second body seals between the first and second valves and the first and second valve cavities. In response to detecting leakage past the first and second body seals, the test fluid is sequentially supplied to first and second valve leak test ports, such that the test fluid is sequentially transmitted through first and second valve leak test passages to the outer peripheral portions of the first and second valve cavities. The leak detection device is used to measure ingress of the test fluid past the first body seal, and to measure ingress of the test fluid past the second body seal.

BRIEF DESCRIPTION OF THE DRAWINGS

Further advantages and benefits will become apparent to those skilled in the art after considering the following description and appended claims in conjunction with the accompanying drawings, in which:

DETAILED DESCRIPTION OF EXEMPLARY EMBODIMENTS

Figure 1:
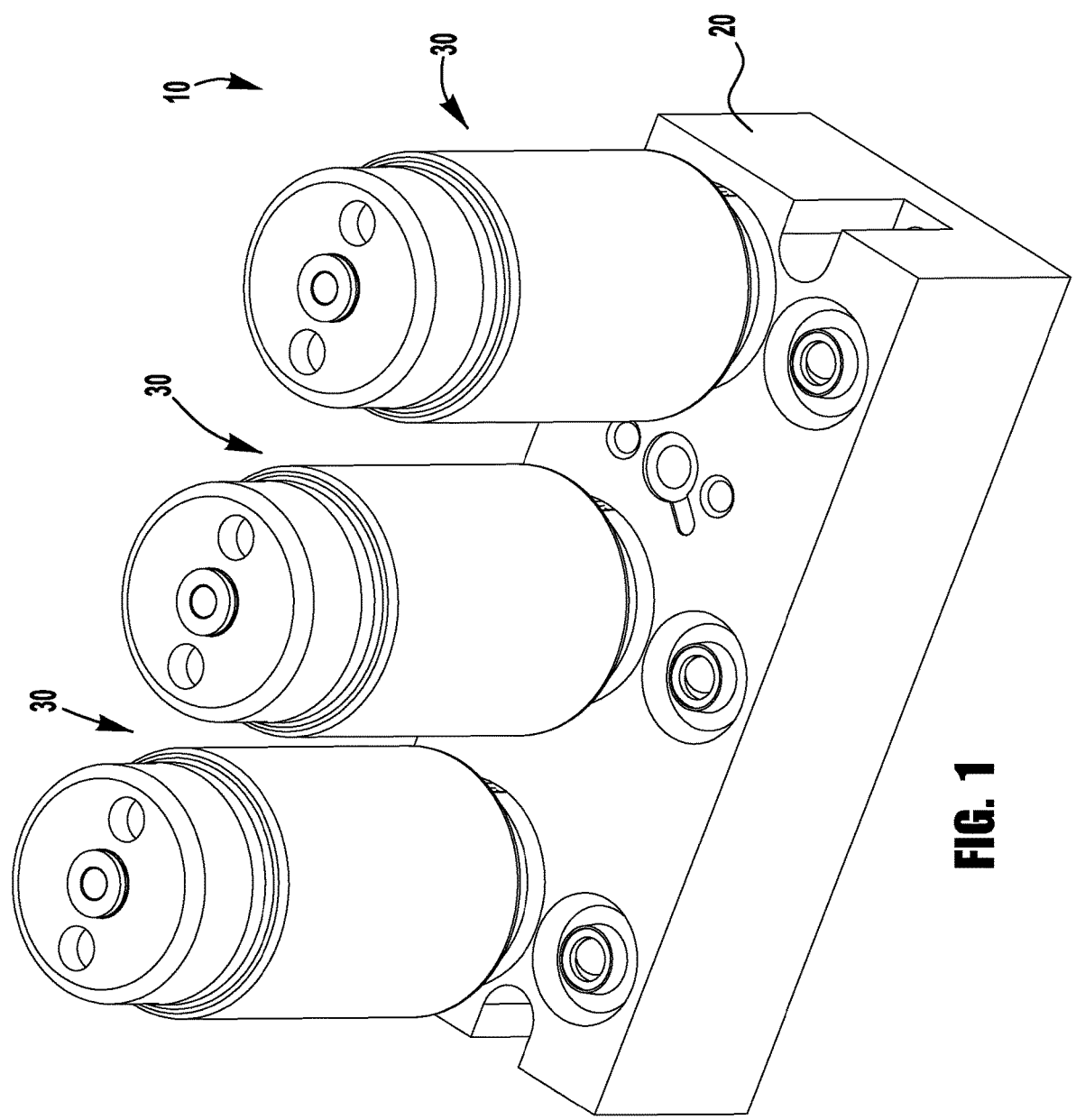
FIG. 1 illustrates a perspective view of an exemplary diaphragm valve manifold assembly.

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while specific exemplary embodiments in the present application describe multiple diaphragm valve manifolds, one or more of the features described herein may additionally or alternatively be applied to other types of multiple valve manifolds (e.g., bellows valves, needle valves, etc.), single valve assemblies, and other fluid system components (e.g., pressure regulators, filters, etc.). Additionally, while the geometries and arrangements of many of the manifold body features described herein are such that their production is facilitated by additive manufacturing, such as 3-D printing, other manufacturing methods may be utilized to fabricate body components having one or more of the features described herein, such as, for example, stacked plate assembly, machining, welding, brazing, and casting (e.g., investment casting, sand casting, lost wax casting), independently or in combination.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include the specified value, values within 5% of the specified value, and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

In the present disclosure, the term "vertical" is used to describe a direction substantially perpendicular to a base (or bottom) surface of the fluid component body, and the term "horizontal" is used to describe a direction substantially parallel to the base surface of the fluid component body. It is to be understood that the fluid component body may be mounted or arranged in any suitable orientation (e.g., with the base surface of the fluid component body extending substantially vertically, or at some other angle).

Figure 1A:
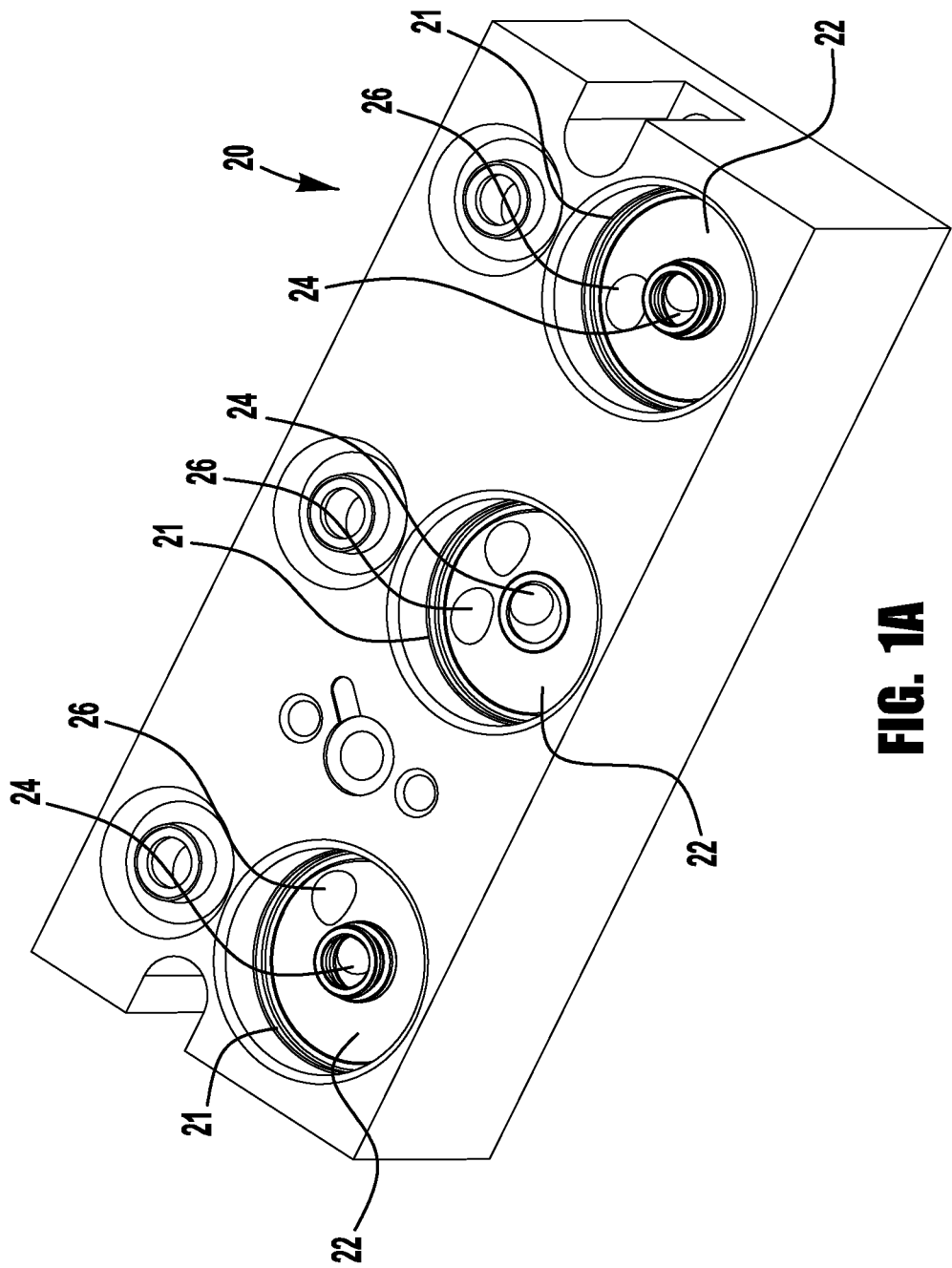
FIG. 1A illustrates a perspective view of the manifold block body of the manifold assembly of FIG. 1.

FIG. 1 illustrates an exemplary conventional three-valve manifold 10 having a manifold body block 20 and diaphragm valves 30 installed in corresponding valve cavities 21 machined in the body block 20. Each valve cavity 21 includes a recessed surface or trepan 22 and a bore wall 23 (FIG. 1A), with at least first and second ports 24, 26 provided in the recessed surface 22.

Figure 2:
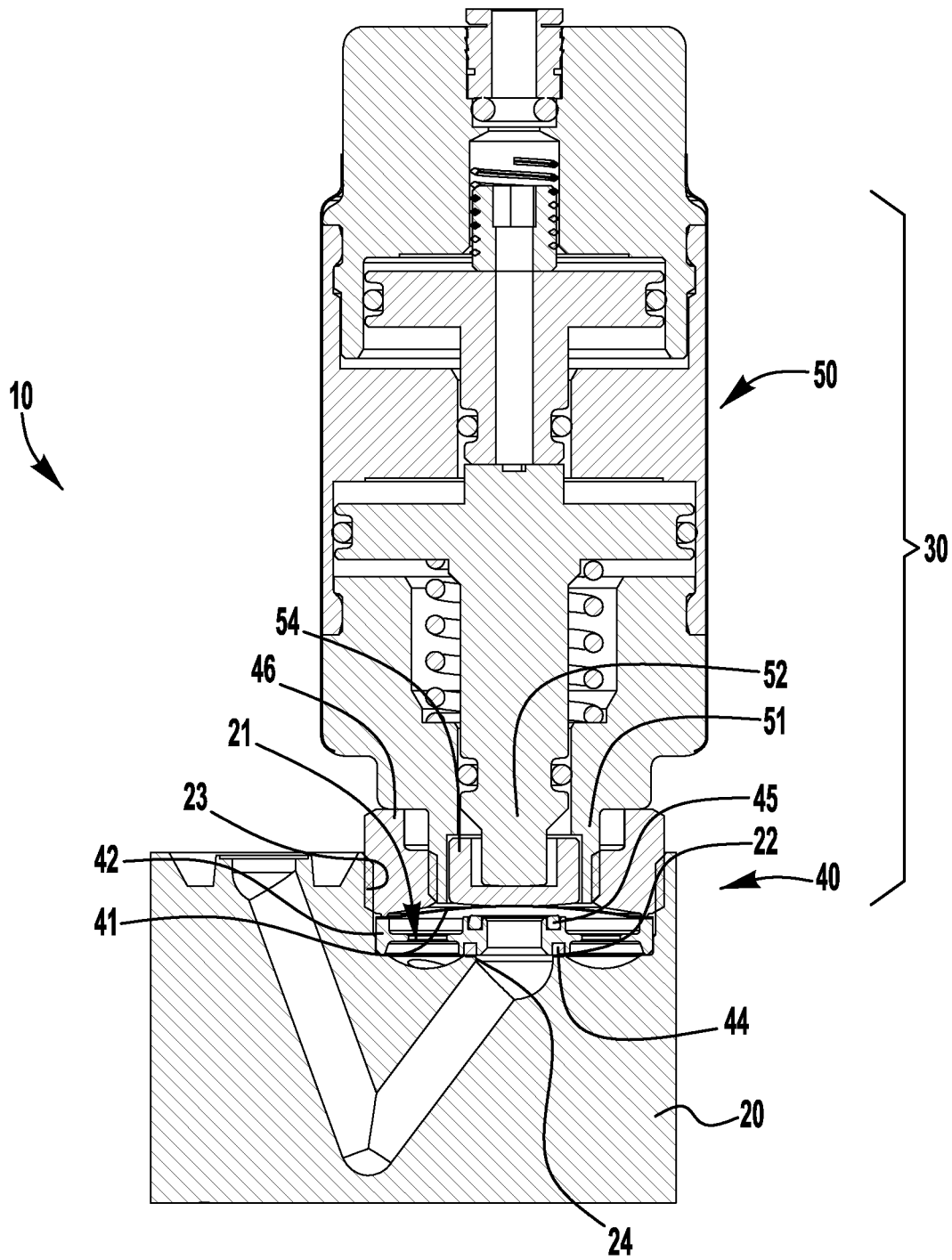
FIG. 2 illustrates a side cross-sectional view of the manifold assembly of FIG. 1, taken through the line 2-2.

Referring to the cross-sectional view of FIG. 2, each valve 30 includes a valve subassembly 40 and an actuator 50. The exemplary valve subassemblies 40 each include a flexible diaphragm 41 and an annular seat carrier 42 received in the valve cavity 21 and including a lower seal portion 44 that seals against the recessed surface 22 around the first port 24 and an upper seal portion 45 that seals against the diaphragm 41 when the diaphragm is moved to the closed position. A threaded retainer or bonnet nut 46 is installed in the valve cavity 21 to clamp the seat carrier 42 and diaphragm 41 against the recessed surface 22, with an outer male threaded portion of the retainer 46 mating with an inner female threaded portion of the bore wall 23. A male threaded bonnet portion 51 of the actuator 50 is threaded into a female threaded portion of the retainer 46 to connect the actuator 50 with the valve subassembly 40 and to position the actuator stem 52 for operative engagement (e.g., using intermediary button 54) with the diaphragm 41. A similar actuated valve assembly is shown and described in co-owned U.S. Pat. No. 9,863,542 (the "'542 patent"), the entire disclosure of which is incorporated herein by reference.

According to an aspect of the present application, a multi-valve manifold body may be formed as a plurality of discrete valve body segments and conduit segments integrated into a single-piece, monolithic construction having a reduced size, weight, and raw material usage as compared to a corresponding manifold body block. Exemplary multi-valve manifold bodies including integrated valve body and conduit segments are shown and described in co-pending US Patent Application Pub. No. 2020/0003318 (the "'318 application"), the entire disclosure of which is incorporated herein by reference.

Many valves, such as, for example, the valve arrangements of the above incorporated '542 patent and '318 application, and as shown in FIG. 2 herein, include a body seal 43 (e.g., gasket, packing, annular sealing bead) providing a leak-tight seal between an internal valve cavity and the external atmosphere surrounding the valve. In the embodiment of FIG. 2, the seat carrier 42 is provided with a lower circumferential bead 43 that seals against an outer periphery of the valve cavity 21 when the threaded retainer 46 is tightened against the seat carrier 42. To detect leakage past the body seal 43, a leak test passage may be provided with the valve, extending from an exterior opening or leak test port to the valve cavity, at a location radially outward of the body seal. To detect leakage, a test fluid (e.g., a tracer gas, such as helium or hydrogen) may be supplied to the leak test port and the valve may be installed in a fluid system under a vacuum and connected with a leak detection device (e.g., mass spectrometer) configured to detect the ingress of the test fluid past the body seal and into the valve cavity. Alternatively, the valve may be installed in a fluid system under positive pressure, with leak testing being implemented (e.g., using a sensor or bubbling leak detection fluid) at the leak detecting port to detect leakage of the positive pressure system fluid past the body seal.

Figure 3:
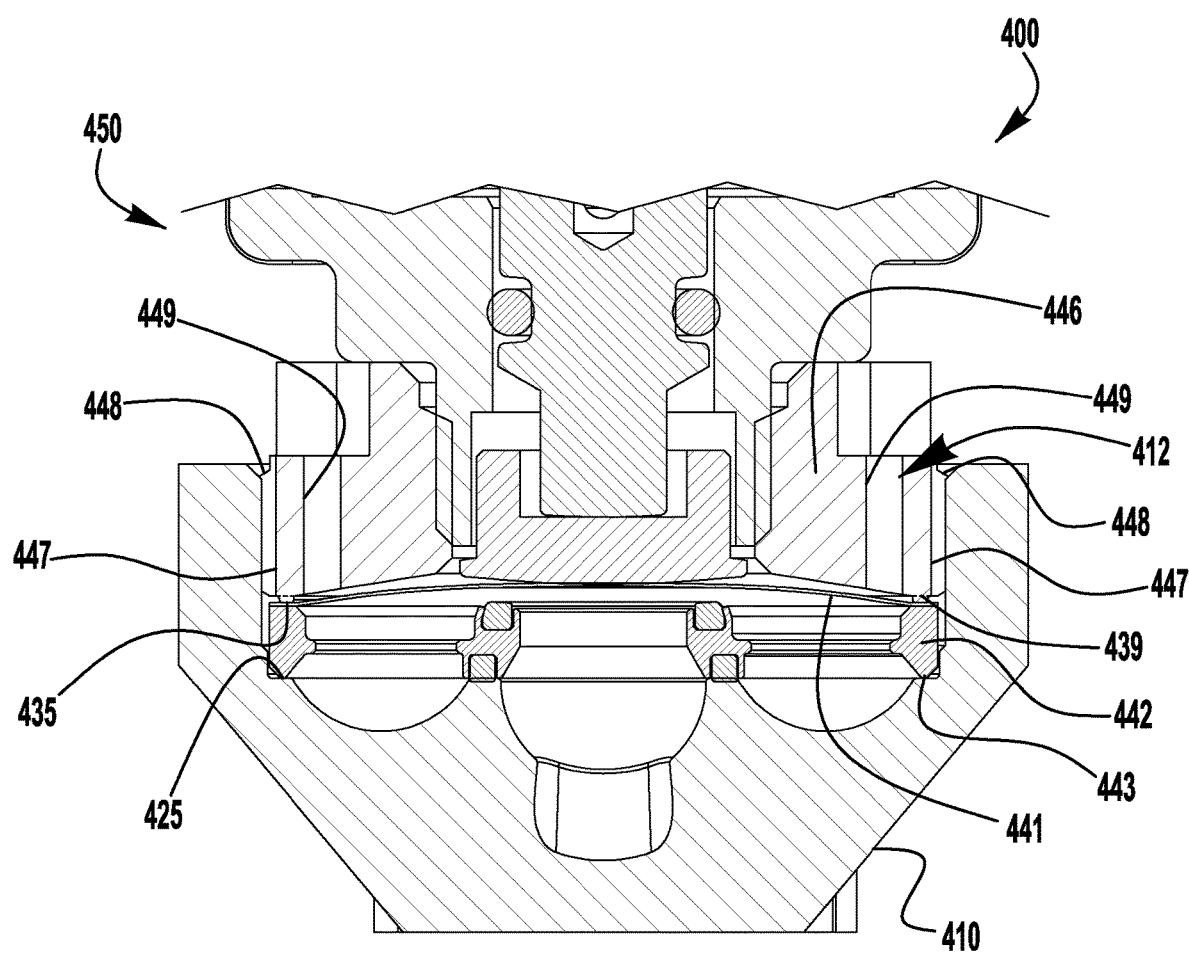
FIG. 3 illustrates a cross-sectional view of a valve assembly including a bonnet nut having a leak test passage.

Many different types of leak test passages may be provided. As one example, as shown in FIG. 3, a valve 400 (e.g., similar to the valve 10 of FIG. 2) having a bonnet nut 446 that is threadably installed in the valve cavity 412 to clamp an outer peripheral bead portion or body seal 443 of a seat carrier 442 against an outer seal surface 425 of the valve cavity 412, is provided with an axially extending outer peripheral groove 447 in the bonnet nut 446 (see FIG. 4) that defines a leak test passage extending to an outer peripheral portion of the valve cavity 412, radially outward of the outer seal surface 425. An upper or outer end of the groove 447 defines a leak test port 448, such that a test fluid (e.g., a tracer gas, such as helium or hydrogen) supplied to the leak test port 448 flows to the outer peripheral portion of the valve cavity 412. When the valve 400 is installed in a fluid system under a vacuum and connected with a leak detection device (e.g., mass spectrometer), ingress of the test fluid past the body seal 443 (e.g., due to a discontinuity or contaminant on the bead portion 443 or outer seal surface 425) and into the valve cavity may be detected to identify a body seal leak.

Figure 4A:
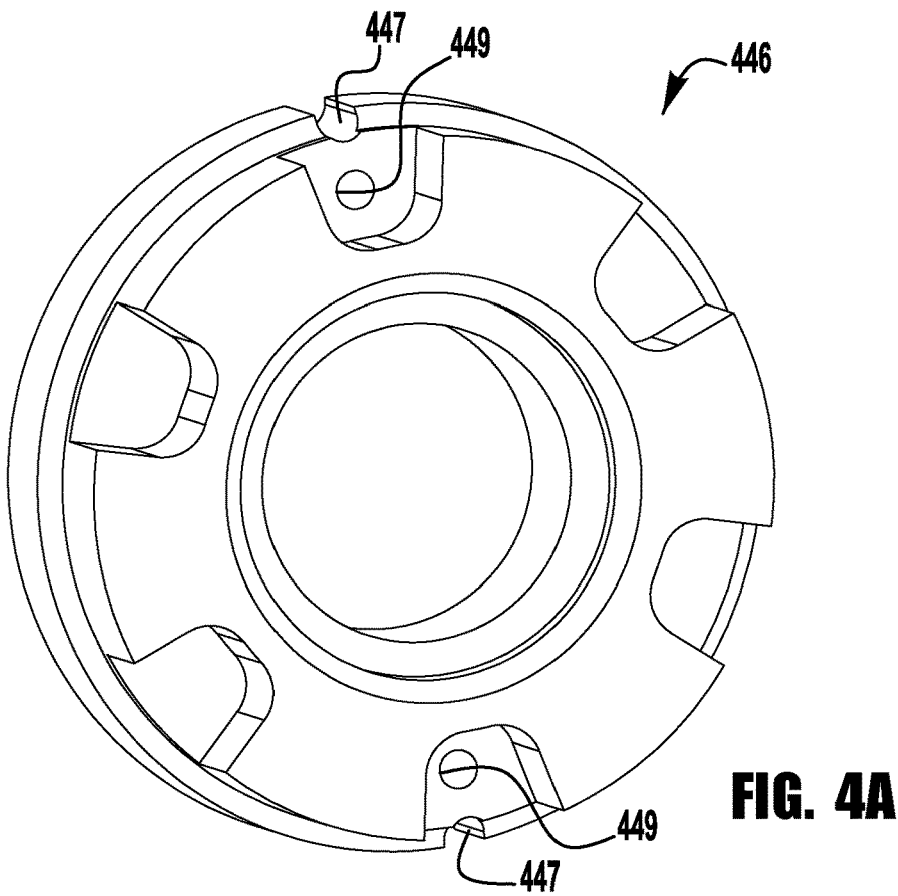
FIG. 4A illustrates an upper perspective view of the bonnet nut of the valve assembly of FIG. 3.
Figure 4B:
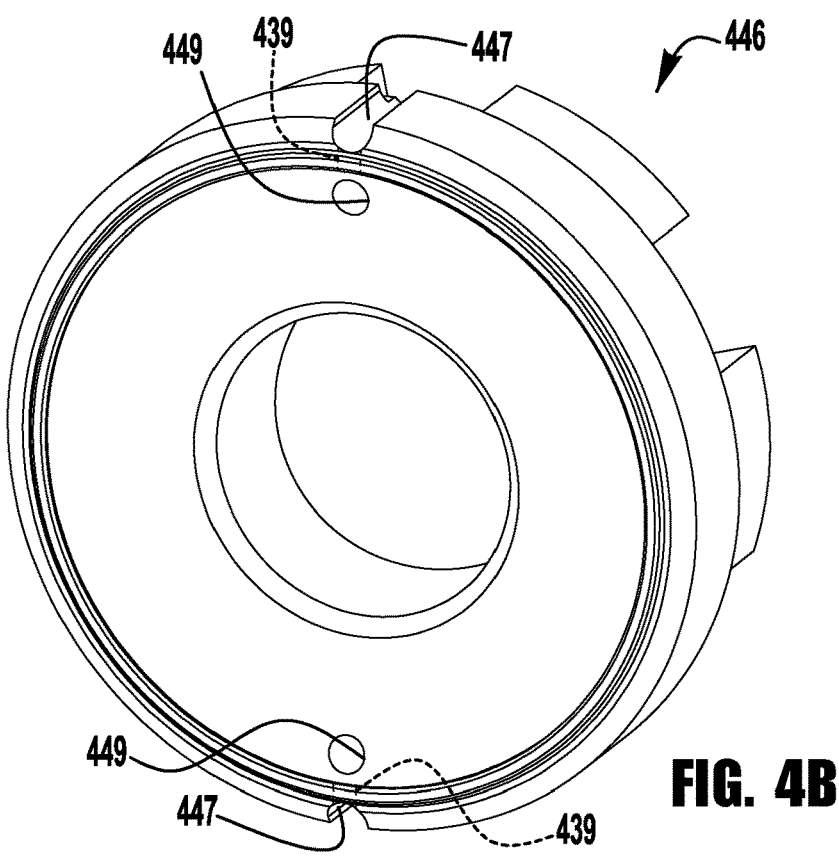
FIG. 4B illustrates a lower perspective view of the bonnet nut of FIG. 4A.

The bonnet nut 446, shown in greater detail in FIGS. 4A and 4B, may be provided with multiple outer peripheral grooves 447, for example, to facilitate convenient positioning of a leak test port regardless of rotational orientation of the bonnet nut 446 with respect to the valve body 410. Additionally, the bonnet nut 446 may include one or more test holes or axially extending inner test passages 449 that extend through the bonnet nut 446 to intersect with the valve cavity radially inward of the body seal and above the diaphragm 441, for example, to test for leakage through the diaphragm 441 (e.g., due to a crack in the diaphragm), for example, during the same vacuum leak test procedure described above. Circumferential alignment of the grooves 447 and holes 449 may facilitate simultaneous leak testing of the diaphragm 441 and body seal 443. In another embodiment, instead of test holes 449, the bonnet nut 446 may instead be provided with one or more radially extending test passages to permit test fluid flow between the outer peripheral portion of the valve cavity 412 and a portion of the valve cavity radially inward of the body seal and above the diaphragm 441. While many different types of radial test passages may be utilized, in an exemplary embodiment, as shown in phantom in FIG. 3, the lower, diaphragm engaging bead 435 of the bonnet nut 446 may be provided with one or more notches 439 defining radial test passages (see FIG. 4B).

According to an aspect of the present disclosure, in another exemplary embodiment, a valve may be provided with a valve body having an integrated leak test passage extending from an external surface of the valve body to an outer peripheral portion of a valve cavity radially outward of a body seal surface. Such an arrangement may provide for consistent placement of the leak test port on the valve (e.g., as compared to a leak test port defined by a bonnet nut).

Figure 5:
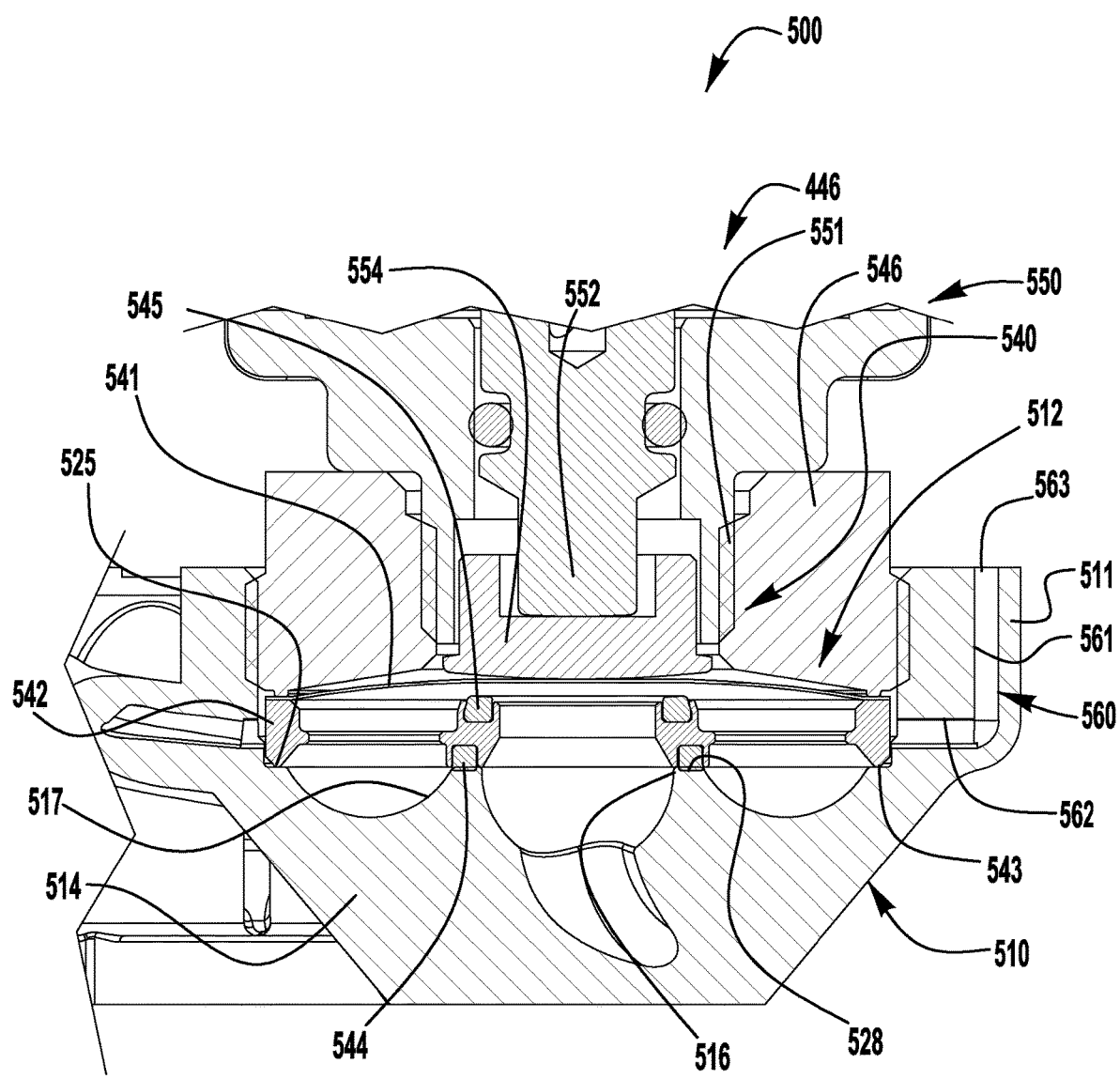
FIG. 5 illustrates a cross-sectional view of a valve assembly including a body having a leak test passage.
Figure 6:
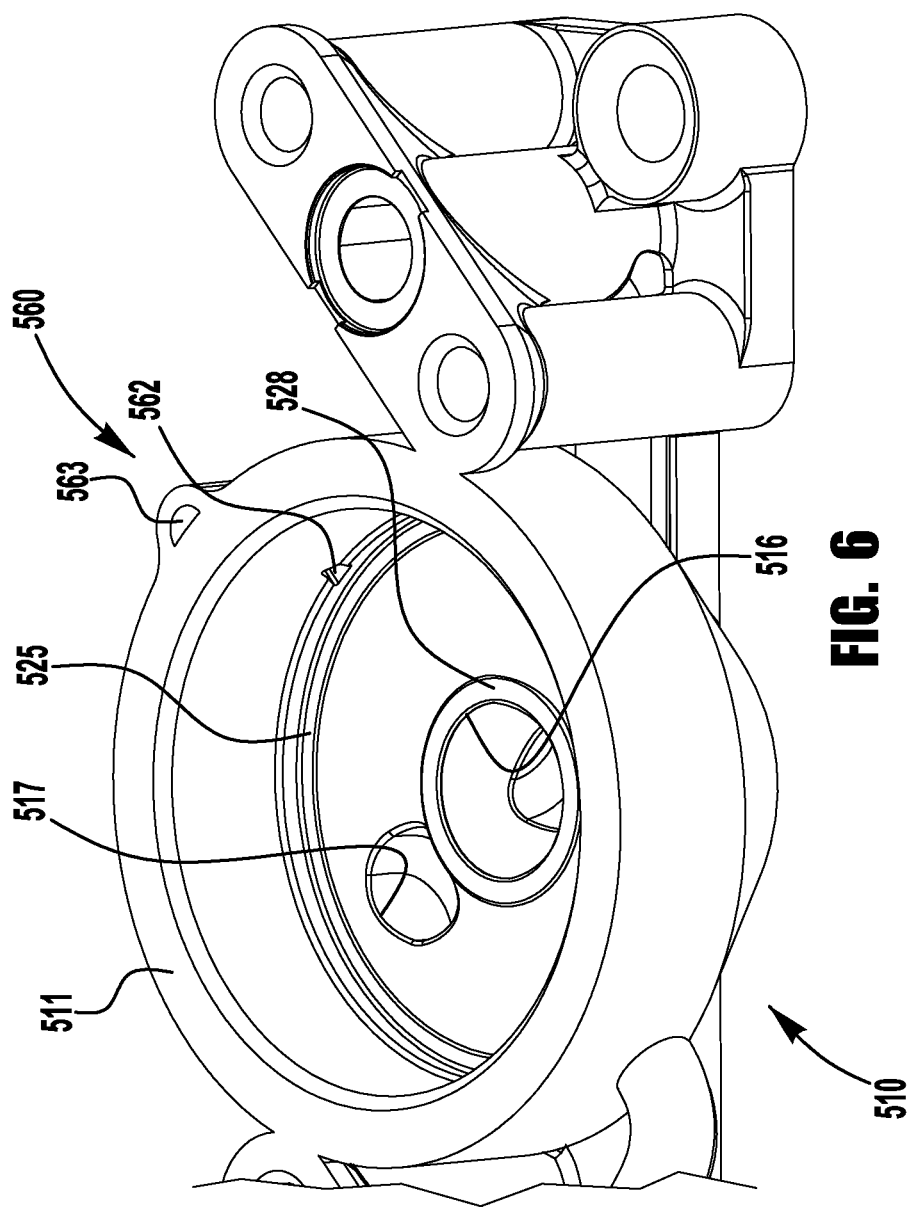
FIG. 6 illustrates a perspective view of the body of the valve assembly of FIG. 5.

While many different valve body integrated leak test passage arrangements may be utilized, in one exemplary embodiment, a leak test passage may be disposed in an upper perimeter wall portion of the valve body that defines the valve cavity. In one such arrangement, as shown in FIG. 5, a valve 500 includes a valve body 510 having an upper perimeter wall portion 511 defining a valve cavity 512, and a lower base portion 514 defining a central flow port 516 and an offset flow port 517 (see FIG. 6). A leak test passage 560 is formed in the upper perimeter wall portion 511 of the valve body 510, with a first portion 561 of the leak test passage extending vertically or axially through the upper perimeter wall portion 511 to a leak test port 563 exposed on an end surface 513 of the upper perimeter wall portion, and a second portion 562 of the leak test passage 560 extending laterally or radially through a base or lower end of the upper perimeter wall portion to the valve cavity to intersect with an outer peripheral portion of the valve cavity 512, radially outward of an outer seal surface 525 in the valve cavity 512.

Similar to the valve 30 of FIG. 2, the valve 500 of FIG. 5 incudes a valve subassembly 540 and an actuator 550. The exemplary valve subassembly 540 includes a flexible diaphragm 541 and an annular seat carrier 542 received in the valve cavity 512 and including a lower seal portion 544 that seals against the recessed surface 528 around the central flow port 516 and an upper seal portion 545 that seals against the diaphragm 541 when the diaphragm is moved to the closed position. A threaded retainer or bonnet nut 546 is installed in the valve cavity 512 to clamp an outer peripheral bead portion or body seal 543 of the seat carrier 542 against the outer seal surface 525 of the valve cavity 512, with an outer male threaded portion of the retainer 546 mating with an inner female threaded portion of the upper perimeter wall portion 511. A male threaded bonnet portion 551 of the actuator 550 is threaded into a female threaded portion of the bonnet nut 546 to connect the actuator 550 with the valve subassembly 540 and to position the actuator stem 552 for operative engagement (e.g., using intermediary button 554) with the diaphragm 541.

When the valve 500 is installed in a fluid system under a vacuum and connected with a leak detection device (e.g., mass spectrometer) and a test fluid (e.g., a tracer gas, such as helium or hydrogen) is supplied to the leak test port 563, ingress of the test fluid past the body seal 543 (e.g., due to a discontinuity or contaminant on the bead portion 543 or outer seal surface 525) and into the valve cavity may be detected to identify a body seal leak. Additionally, the bonnet nut may be provided with one or more inner test passages or radial test passages (as shown in the embodiment of FIG. 3) to simultaneously test for leakage through the diaphragm (e.g., due to a crack in the diaphragm).

Figure 7:
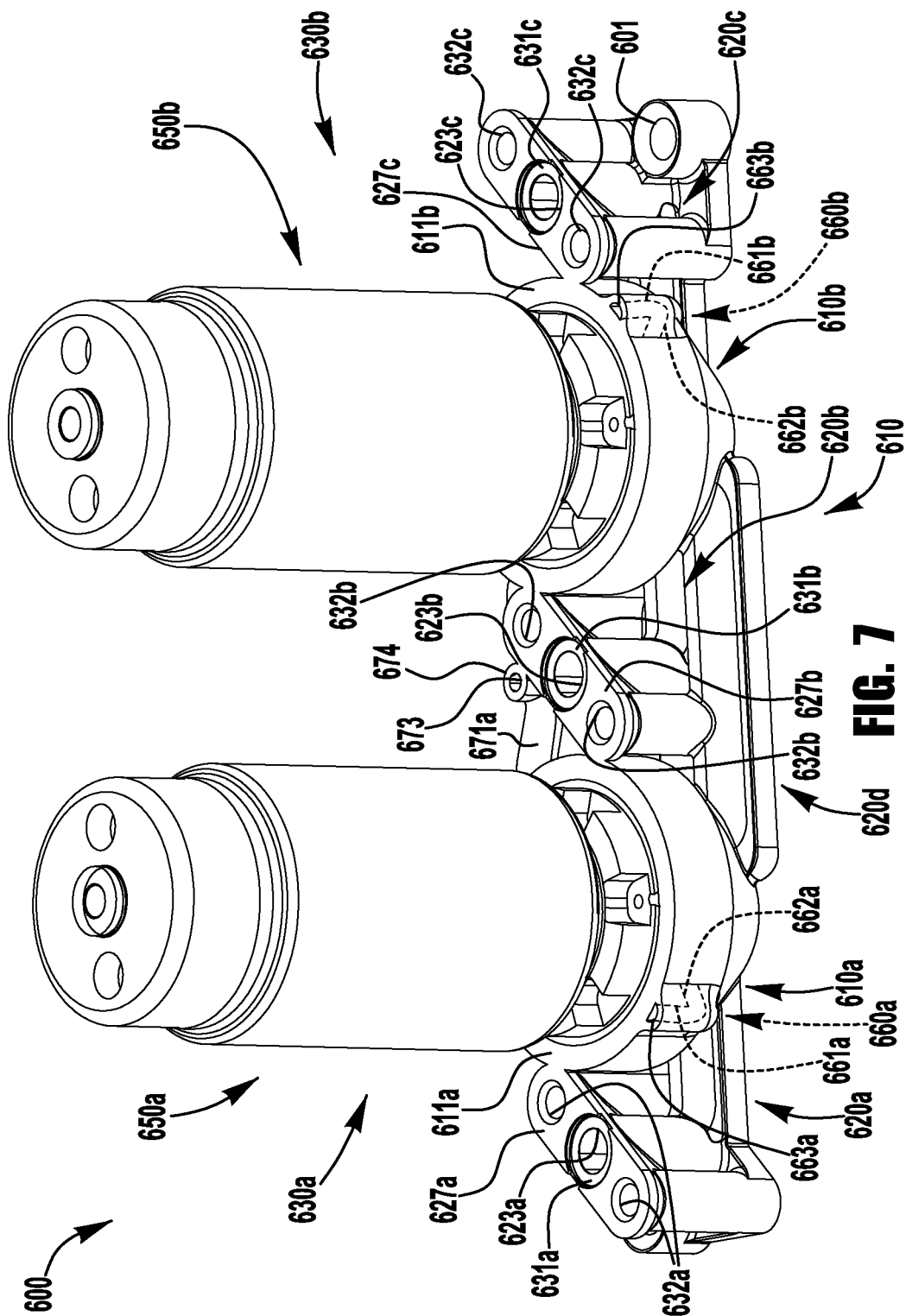
FIG. 7 illustrates an upper perspective view of a two-valve manifold assembly having a manifold body with a unified leak test port, in accordance with an exemplary embodiment of the present disclosure.
Figure 8:
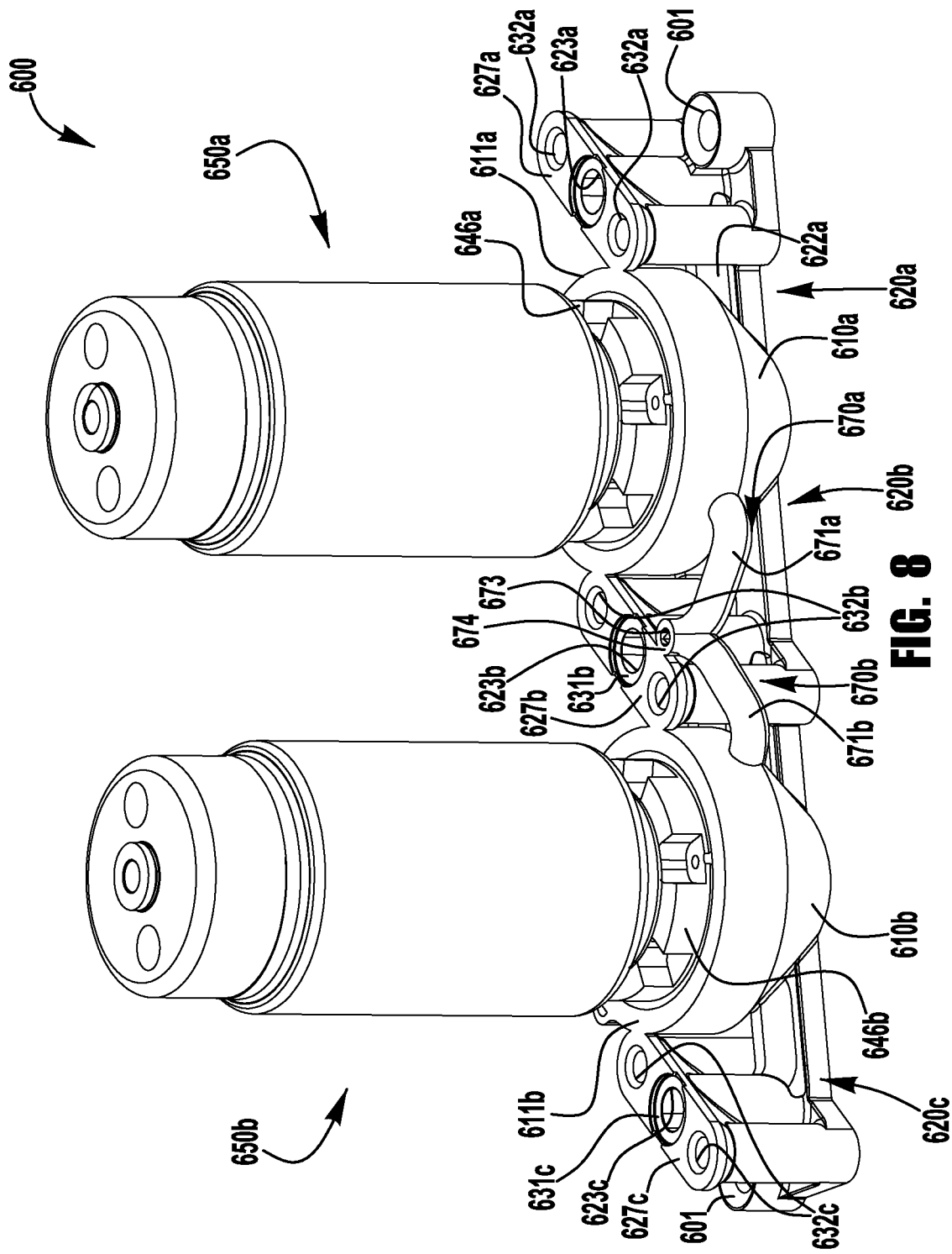
FIG. 8 illustrates another upper perspective view of the manifold assembly of FIG. 7.
Figure 9:
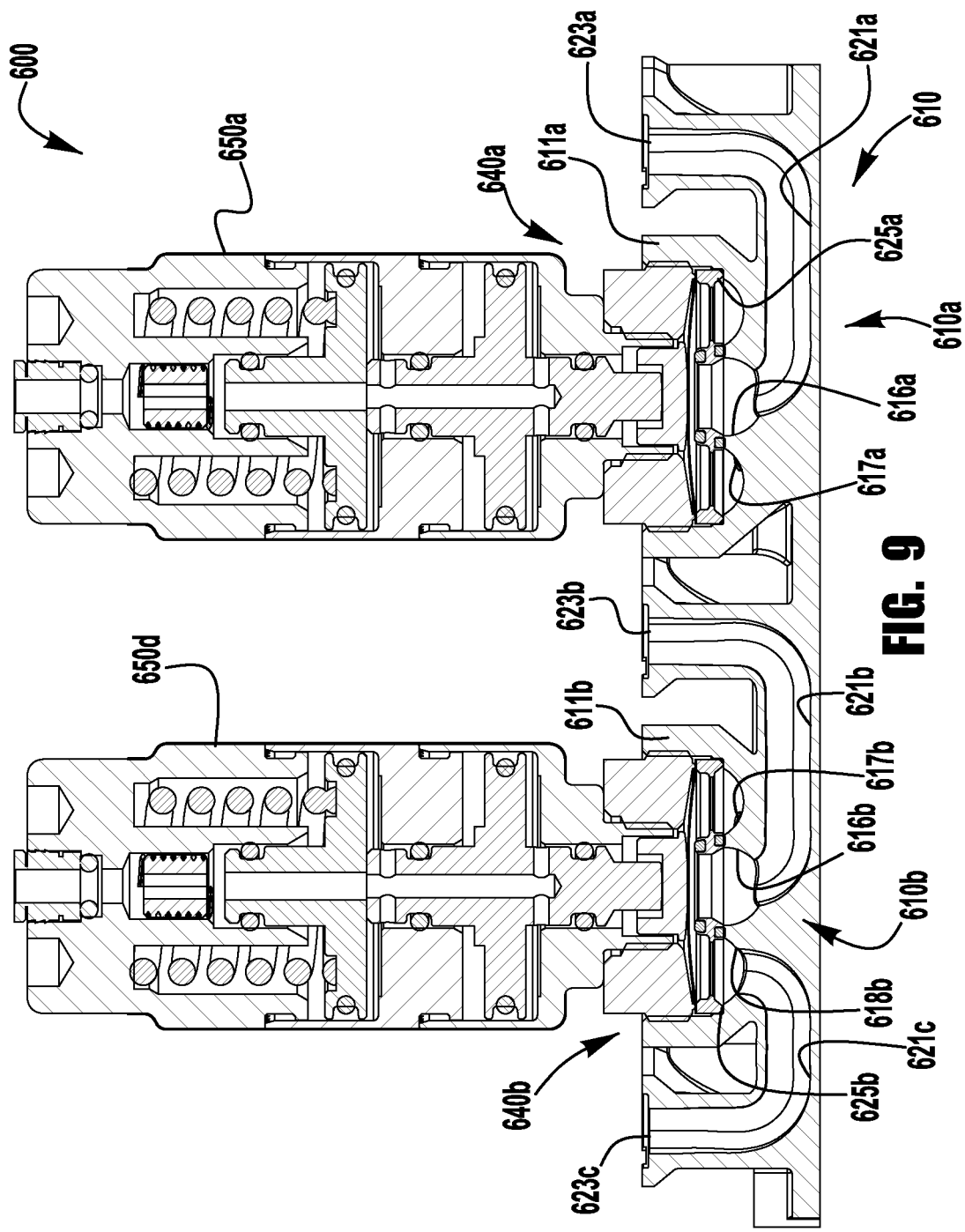
FIG. 9 illustrates a front cross-sectional view of the manifold assembly of FIG. 7.
Figure 10:
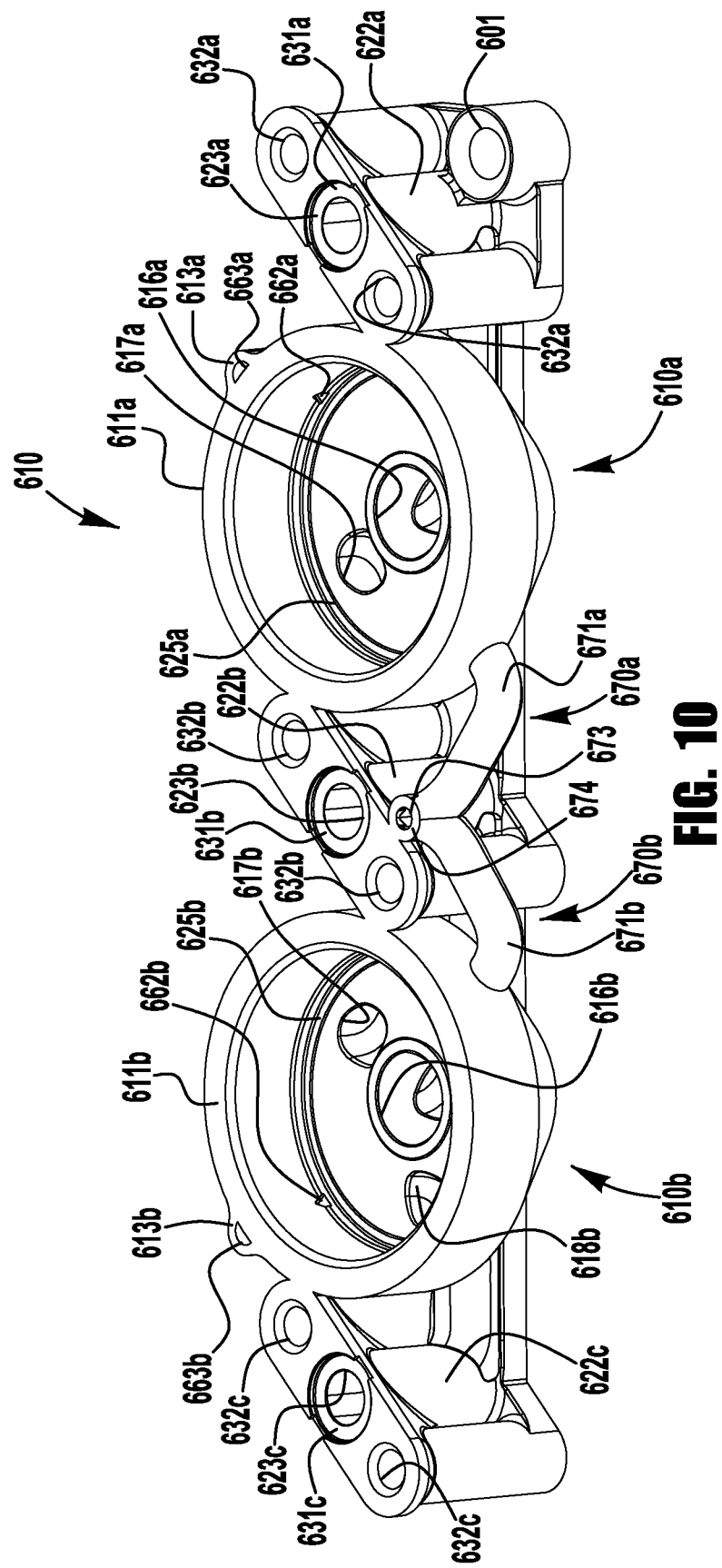
FIG. 10 illustrates an upper perspective view of the manifold body of the manifold assembly of FIG. 7.

An integrated leak test passage may be provided in a valve body for a single valve assembly or in multiple valve body segments of a valve manifold, such as, for example the multi-valve manifold bodies of the above incorporated '542 patent and '318 application. FIGS. 7-9 illustrate an exemplary two-valve manifold assembly 600 having a manifold body 610 (see FIGS. 10-11) including first and second valve body segments 610a, 610b assembled with corresponding first and second valves 630a, 630b, each including a valve subassembly 640a, 640b and an actuator 650a, 650b. As shown, the valve subassemblies 640a, 640b may be similar to the valve subassembly 540 of FIG. 5, as described in greater detail above, the components for which are numbered accordingly.

Each of the first and second valve body segments 610a, 610b has an upper perimeter wall portion 611a, 611b defining a valve cavity 612a, 612b, and a lower base portion 614a, 614b defining a central flow port 616a, 616b and offset flow ports 617a, 617b, 618b. Adjacent perimeter wall portions 611a, 611b of adjacent valve body segments 610a, 610b may be joined or fused together, for example, to facilitate manufacturing, to reduce overall size of the manifold body 610 and/or to strengthen or reinforce these wall portions. Apertured mounting bosses 601 may be provided, for example, fused with an adjacent portion of the upper perimeter wall of one of the first and second valve segments, to facilitate mounting of the manifold within a system (e.g., to a plate or other such base component of a fluid system).

Figure 11:
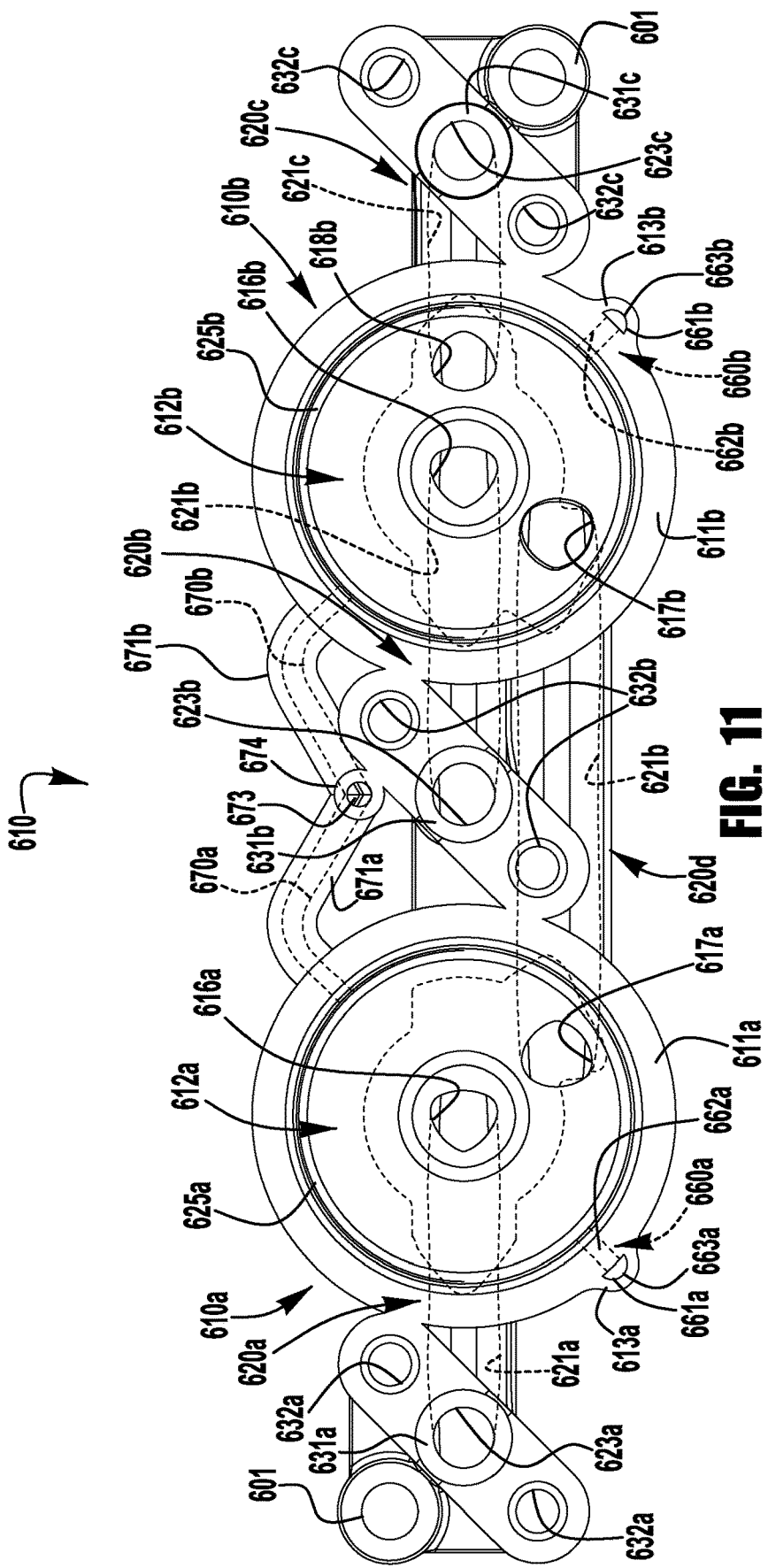
FIG. 11 illustrates a top plan view of the manifold body of the manifold assembly of FIG. 7, shown in phantom to illustrate additional features of the manifold body.

While many different flow porting configurations may be utilized, in the illustrated embodiment, the first and second valve body segments 610a, 610b are connected with first, second, third, and fourth flow conduit segments 620a, 620b, 620c, 620d, as shown in FIG. 11. The first flow conduit segment 620a includes a first flow passage 621a extending between a first end port 623a and the central flow port 616a of the first valve body segment 610a. The second flow conduit segment 620b includes a second flow passage 621b extending between a second end port 623b and the central flow port 616b of the second valve body segment 610b. The third flow conduit segment 620c includes a third flow passage 621c extending between a third end port 623c and the second offset port 618b of the second valve body segment 610b. The fourth flow conduit segment 620d includes a fourth flow passage 621d extending between the offset port 617a of the first valve body segment 610a and the first offset port 617b of the second valve body segment 610b.

While many different types of end ports may be utilized, in the illustrated embodiment, the end ports 623a, 623b, 623c include tubular portions 622a, 622b, 622c extending upward or vertically, spaced apart from the valve body segment perimeter wall portions 611a, 611b, to modular mount surfaces 627a, 627b, 627c including seal counterbores 631a, 631b, 631c and fastener bores 632a, 632b, 632c for accommodating modular C-seal connections.

The base portions 614a, 614b of the valve body segments 610a, 610b may be tapered (e.g., to have an outer diameter smaller than an outer diameter of the perimeter wall 611a, 611b), for example, to reduce material usage and/or to provide clearance for one or more of the flow conduit segments 620a, 620b, 620c, 620d, such that a horizontal flow path portion 624a, 624b, 624c of the flow conduit segment is at least partially laterally aligned with the valve cavity of at least one of the valve body segments.

A leak test passage 660a, 660b is formed in the upper perimeter wall portion 611a, 611b of each valve body segment 610a, 610b, with a first portion 661a, 661b of the leak test passage extending vertically or axially through the upper perimeter wall portion 611a, 611b to a leak test port 663a, 663b exposed on an end surface 613a, 613b of the upper perimeter wall portion, and a second portion 662a, 662b of the leak test passage 660a, 660b extending laterally or radially through a base or lower end of the upper perimeter wall portion to the valve cavity 612a, 612b to intersect with an outer peripheral portion of the valve cavity, radially outward of the outer seal surface 625a, 625b.

To test for leakage past each valve body seal in the manifold valve assembly, in an exemplary method, the manifold assembly 600 is installed in a fluid system under a vacuum and connected with a leak detection device (e.g., mass spectrometer) and a test fluid (e.g., a tracer gas, such as helium or hydrogen) is sequentially supplied to each of the leak test ports 663a, 663b, and the leak detection device is used to measure ingress of the test fluid past the body seal 643a, 643b (e.g., due to a discontinuity or contaminant on the bead portion 643a, 643b or outer seal surface 625a, 625b) and into the valve cavity to identify a body seal leak. Additionally, the bonnet nuts 646a, 646b may be provided with one or more inner test passages or radial test passages (as shown in the embodiment of FIG. 3) to simultaneously test for leakage through the diaphragm (e.g., due to a crack in the diaphragm).

Where the leak testing is performed sequentially for each valve body seal in a multi-valve manifold assembly, this testing may be relatively time consuming. According to another aspect of the present disclosure, a multi-valve manifold body may be provided with an integrated, unified leak test port with branching leak test passages intersecting with a plurality of valve cavities of the manifold body, for simultaneously testing of the valve body seals of two or more of the manifold valves. In such an arrangement, application of a test fluid to the unified leak test port may provide for confirmation of leakage past at least one of the body seals of the plurality of valve body segments. In the event of such a confirmation, individual leak test ports and passages (e.g., in the bonnet nut and/or manifold body, as described and shown in the embodiments of FIGS. 3-5) may be utilized to identify which of the valve body segments is exhibiting body seal leakage.

Figure 12:
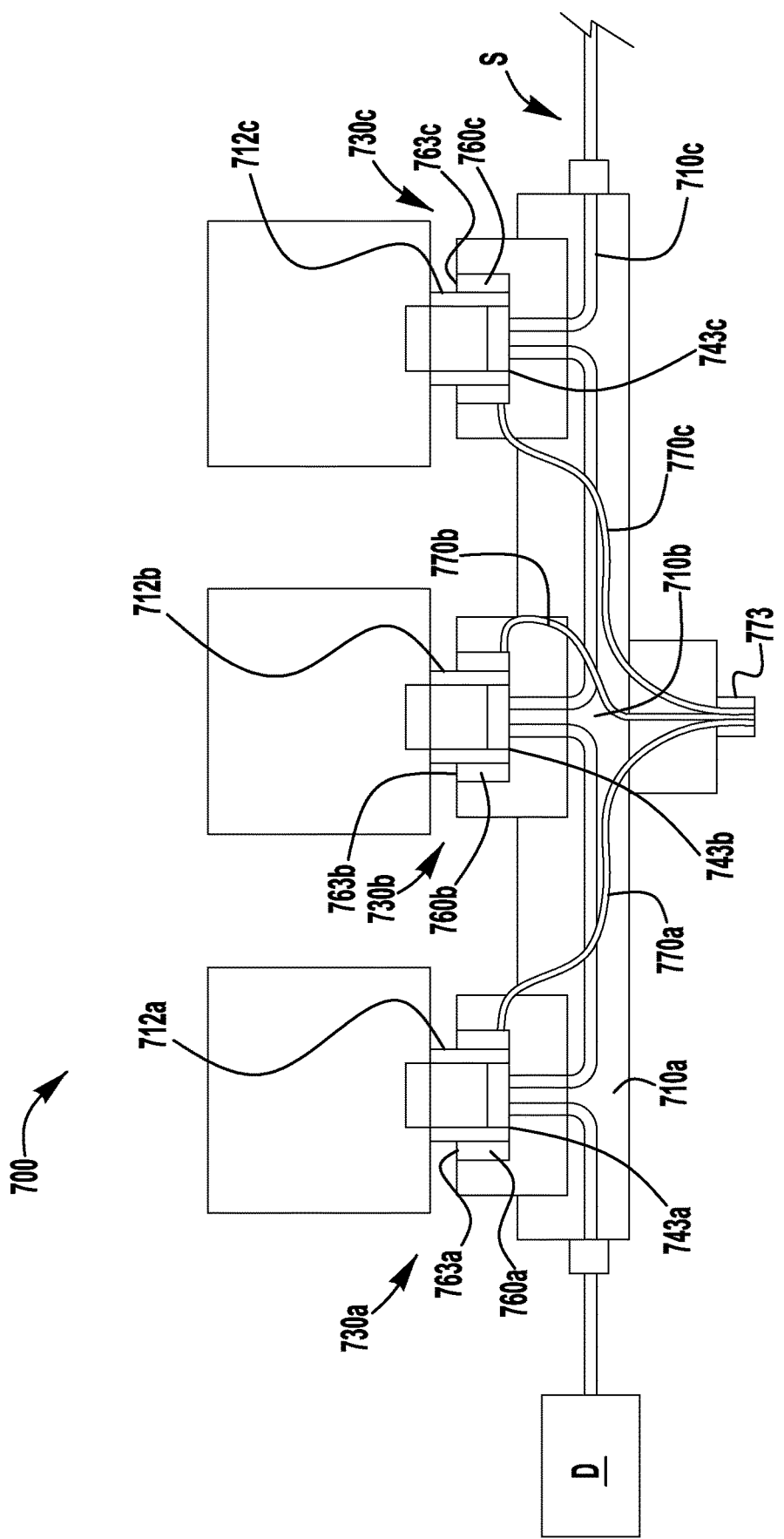
FIG. 12 schematically illustrates a multi-valve manifold assembly including a unified leak test port for collectively testing for leakage past the body seals of the multiple valves of the manifold assembly, and individual leak test ports for independently testing for leakage past the body seals of each valve of the manifold assembly.

FIG. 12 schematically illustrates a multi-valve manifold assembly 700 including a unified leak test port 773 connected by branching leak test passages 770a, 770b, 770c to the valve cavities 712a, 712b, 712c of multiple valve body segments 710a, 710b, 710c for collectively testing for leakage past the body seals 743a, 743b, 743c of the multiple valves 730a, 730b, 730c of the manifold assembly, and individual leak test ports 763a, 763b, 763c connected by leak test passages 760a, 760b, 760c to the valve cavities for independently testing for leakage past the body seals of each valve of the manifold assembly. While the manifold assembly 700 of FIG. 12 includes three valve assemblies, in other embodiments, unified and individual leak test ports may be provided for manifold assemblies having a different number of valves (e.g., two, or four or more). Additionally, a unified leak test port may be connected with fewer than all of the valves of a multi-valve manifold assembly. For example, a manifold assembly may include a first unified leak test port for testing leakage past the body seals of a first plurality of valves of the manifold assembly, and a second unified leak test port for testing leakage past the body seals of a second plurality of valves of the manifold assembly.

In an exemplary method of leak testing the manifold assembly 700, the manifold assembly is installed in a fluid system S under a vacuum and connected with a leak detection device D (e.g., mass spectrometer) and a test fluid (e.g., a tracer gas, such as helium or hydrogen) is supplied to the unified leak test port 773 and transmitted through the branching leak test passages 770a, 770b, 770c to outer peripheral portions of the valve cavities 712a, 712b, 712c, and the leak detection device D is used to measure ingress of the test fluid past the body seals 743a, 743b, 743c and into the valve cavities to identify a body seal leak. If no leakage is detected by the leak detection device D (e.g., detected helium sufficient to indicate leakage), no further leak testing is needed. If leakage is detected by the leak detection device, the test fluid is sequentially supplied to each of the individual leak test ports 763a, 763b, 763c and the leak detection device D is used to measure ingress of the test fluid past each body seal 743a, 743b, 743c to determine which valve body seals are exhibiting leakage.

In the embodiment of FIGS. 7-11, the manifold body 610 includes an integrated unified leak test port 673 connected with the valve cavities 612a, 612b of the valve body segments 610a, 610b by leak test passages 670a, 670b branching from the leak test port, such that a first end of each leak test passage intersects with the leak test port, and a second end of each leak test passage intersects with an outer peripheral portion of the valve cavity 612a, 612b, radially outward of the outer seal surface 625a, 625b. In the illustrated embodiment, the leak test port 673 and leak test passages 670a, 660b are defined by vent conduit segments 674, 671a, 671b integrally formed with the manifold body 610. In other embodiments (not shown), the leak test port and leak test passages may be defined by conduits attached to or assembled with the manifold body (e.g., by welding, brazing, fitting connections), or by passages formed in a manifold block body (e.g., by drilling, machining, etc.). As shown, the leak test port 673 is centrally disposed between the two valve body segments 610a, 610b, for example, to facilitate uniform flow of a supplied test fluid (e.g., helium) to the two leak test passages 670a, 670b. The interior bore of the leak test port 673 may be contoured (e.g., conical) to closely receive a test fluid supply tube, for example, to more efficiently deliver test fluid to the leak test passages.

In an exemplary method of leak testing a manifold assembly 600, the manifold assembly is installed in a fluid system under a vacuum and connected with a leak detection device (e.g., mass spectrometer) and a test fluid (e.g., a tracer gas, such as helium or hydrogen) is supplied to a unified leak test port 673 and transmitted through branching leak test passages 670a, 670b to outer peripheral portions of the valve cavities 612a, 612b, and the leak detection device is used to measure ingress of the test fluid past the body seal (e.g., due to a discontinuity or contaminant on the bead portion 643a, 643b or outer seal surface 625a, 625b) and into the valve cavity to identify a body seal leak. Additionally, the bonnet nuts 646a, 646b may be provided with one or more inner test passages or radial test passages (as shown in the embodiment of FIG. 3) to simultaneously test for leakage through the diaphragm (e.g., due to a crack in the diaphragm).

If no leakage is detected by the leak detection device (e.g., detected helium sufficient to indicate leakage), no further leak testing is needed. If leakage is detected by the leak detection device, the test fluid is sequentially supplied to each of the individual leak test ports 663a, 663b, and the leak detection device is used to measure ingress of the test fluid past each body seal (and optionally, through each diaphragm) to determine which valve body seals (and/or diaphragms) are exhibiting leakage.

The overall shape and internal flow path arrangements of a fluid component body (e.g., a manifold body) may make the body difficult to manufacture using conventional machining, molding, or casting techniques. According to an aspect of the present disclosure, a fluid component body, for example, the manifold bodies of the above incorporated '542 patent and '318 application, and the manifold bodies explicitly described and shown herein, may be fabricated using additive manufacturing to produce a monolithic body having discrete, but partially joined or fused, valve body segments and conduit segments. Examples of additive manufacturing techniques that may be utilized include, for example: laser powder bed fusion (direct metal laser sintering or "DMLS," selective laser sintering/melting or "SLS/SLM," or layered additive manufacturing or "LAM"), electron beam powder bed fusion (electron beam melting or "EBM"), ultrasonic additive manufacturing ("UAM"), or direct energy deposition (laser powder deposition or "LPD," laser wire deposition or "LWD," laser engineered net-shaping or "LENS," electron beam wire deposition). Providing a manifold body as a single, monolithic component may eliminate assembly costs, reduce component wear, reduce adverse effects from heat cycling, improve corrosion behavior (galvanic effects, crevice, stress corrosion cracking), and reduce lead time to manufacture. Further, fabrication using additive manufacturing may reduce the amount of raw material used, and may reduce the size and weight of the finished body.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A manifold body comprising:
   at least first and second valve body segments each comprising an upper perimeter wall portion defining a valve cavity and a lower base portion defining one or more flow ports;
   a unified leak test port;
   a first branch leak test passage extending from the unified leak test port to an outer peripheral portion of the valve cavity of the first valve body segment, radially outward of an outer seal surface in the valve cavity; and
   a second branch leak test passage extending from the unified leak test port to an outer peripheral portion of the valve cavity of the second valve body segment, radially outward of an outer seal surface in the valve cavity.

2. The manifold body of claim 1, wherein each of the first and second valve body segments comprises a valve leak test passage formed in the upper perimeter wall portion and extending from a valve leak test port exposed on an end surface of the upper perimeter wall portion to the valve cavity to intersect with the outer peripheral portion of the valve cavity, radially outward of the outer seal surface.

3. The manifold body of claim 1, further comprising at least one flow conduit segment extending from one of the one or more flow ports to an end port.

4. The manifold body of claim 1, wherein the manifold body is a monolithic component.

5. The manifold body of claim 1, wherein at least a portion of the manifold body is produced using additive manufacturing techniques.

6. A manifold assembly including the manifold body of claim 1, a first valve subassembly installed in the valve cavity of the first valve segment, and a second valve subassembly installed in the valve cavity of the second valve segment.

7. The manifold assembly of claim 6, wherein the first valve subassembly is threadably engaged with a threaded portion of the perimeter wall of the first valve segment, and the second valve subassembly is threadably engaged with a threaded portion of the perimeter wall of the second valve segment.

8. The manifold assembly of claim 6, wherein
each of the first and second valve subassemblies comprises:
   a flexible diaphragm;
   an annular seat carrier received in the valve cavity and including a lower seal portion that seals against a recessed surface around the central flow port and an upper seal portion that seals against the diaphragm when the diaphragm is moved to the closed position; and
   a threaded bonnet nut installed in the valve cavity to clamp the seat carrier against the outer seal surface in the valve cavity to form a body seal.

9. The manifold assembly of claim 8, wherein the bonnet nuts of the first and second valve subassemblies include one or more axially extending inner test passages that extend through the bonnet nut to intersect with the valve cavity radially inward of the body seal and above the diaphragm.

10. The manifold assembly of claim 8, wherein the bonnet nuts of the first and second valve subassemblies include one or more radially extending test passages to permit test fluid flow between the outer peripheral portion of the valve cavity and a portion of the valve cavity radially inward of the body seal and above the diaphragm.

11. The manifold assembly of claim 8, wherein each of the first and second valve body segments comprises a valve leak test passage formed in the upper perimeter wall portion and extending from a valve leak test port exposed on an end surface of the upper perimeter wall portion to the valve cavity to intersect with the outer peripheral portion of the valve cavity, radially outward of the outer seal surface.

12. The manifold assembly of claim 8, wherein the bonnet nuts of the first and second valve subassemblies include one or more axially extending outer peripheral grooves that extending to an outer peripheral portion of the valve cavity, radially outward of the outer seal surface, to define a valve leak test passage.

13. A valve body comprising:
   an upper perimeter wall portion defining a valve cavity and a lower base portion defining one or more flow ports; and
   a leak test passage formed in the upper perimeter wall portion of the valve body, with a first portion of the leak test passage extending axially through the upper perimeter wall portion to a leak test port exposed on an end surface of the upper perimeter wall portion, and a second portion of the leak test passage extending laterally or radially through a lower end of the upper perimeter wall portion to the valve cavity to intersect with an outer peripheral portion of the valve cavity, radially outward of an outer seal surface in the valve cavity.

14. The valve body of claim 13, wherein the upper perimeter wall portion and the lower base portion form a first valve segment, the valve body further comprising a second valve segment including a second upper perimeter wall portion defining a second valve cavity and a second lower base portion defining one or more flow ports.

15. The valve body of claim 13, wherein the manifold body is a monolithic component.

16. The valve body of claim 13, wherein at least a portion of the valve body is produced using additive manufacturing techniques.

17. A valve assembly comprising:
   the valve body of claim 13; and
   a valve subassembly comprising:
      a flexible diaphragm;
      an annular seat carrier received in the valve cavity and including a lower seal portion that seals against a recessed surface around the central flow port and an upper seal portion that seals against the diaphragm when the diaphragm is moved to the closed position; and
      a threaded bonnet nut installed in the valve cavity to clamp the seat carrier against the outer seal surface in the valve cavity to form a body seal.

18. The valve assembly of claim 17, wherein the bonnet nut includes one or more axially extending inner test passages that extend through the bonnet nut to intersect with the valve cavity radially inward of the body seal and above the diaphragm.

19. The valve assembly of claim 17, wherein the bonnet nut includes one or more radially extending test passages to permit test fluid flow between the outer peripheral portion of the valve cavity and a portion of the valve cavity radially inward of the body seal and above the diaphragm.

* * * * *